US006721703B2

United States Patent
Jackson et al.

(10) Patent No.: US 6,721,703 B2
(45) Date of Patent: Apr. 13, 2004

(54) REMOTE DEPOSITION SYSTEM AND METHOD

(76) Inventors: Jay M. Jackson, 111 E. Chestnut, Apt. 579, Chicago, IL (US) 60610; Julie J. Furer, 435 W. Erie, Apt. 2006, Chicago, IL (US) 60610

( * ) Notice: Subject to any disclaimer, the term of this patent is extended or adjusted under 35 U.S.C. 154(b) by 262 days.

(21) Appl. No.: 09/798,195

(22) Filed: Mar. 2, 2001

(65) Prior Publication Data

US 2002/0123883 A1 Sep. 5, 2002

(51) Int. Cl.[7] .............................................. G10L 21/06
(52) U.S. Cl. .................... 704/270; 704/270.1; 704/201; 704/235
(58) Field of Search ............................... 704/235, 270, 704/275, 270.1; 370/352; 386/85

(56) References Cited

U.S. PATENT DOCUMENTS

| 4,860,339 | A | * | 8/1989 | D'Agosto, III et al. ....... 379/67 |
| 5,369,704 | A | * | 11/1994 | Bennett et al. ............... 386/46 |
| 5,878,186 | A | * | 3/1999 | Bennett et al. ............... 386/85 |
| 5,949,952 | A | * | 9/1999 | Bennet et al. ................ 386/46 |
| 6,023,675 | A | * | 2/2000 | Bennet et al. ................ 704/235 |
| 6,282,510 | B1 | * | 8/2001 | Bennet et al. ............... 704/235 |
| 6,335,927 | B1 | * | 1/2002 | Elliott et al. ................. 370/352 |
| 6,409,661 | B1 | * | 6/2002 | Murphy ........................ 600/300 |
| 6,513,003 | B1 | * | 1/2003 | Angell ......................... 704/235 |

* cited by examiner

Primary Examiner—Susan McFadden
(74) Attorney, Agent, or Firm—Schiff Hardin LLP

(57) ABSTRACT

A remote deposition system includes a computer connected to a high speed network connection to which are connected microphones, a video camera and a shorthand writing machine of an official reporter at the deposition site. Audio, video and transcript text is transmitted over the network to a remote computer. A chat communications link is established between the remote computer and the computer at the deposition for two way text communication. Two way audio communications are also possible, as are set objection commands by the remote user. The remote user, or several remote users, access the data over standard Internet software and connections. Playback and editing of the recorded deposition is possible with text, audio and video playback from an Internet connection with a suite of tools. A service of providing the deposition remotely is provided as well.

19 Claims, 5 Drawing Sheets

REMOTE DEPOSITION SYSTEM AND METHOD

BACKGROUND OF THE INVENTION

1. Field of the Invention

The present invention relates generally to a method and apparatus for conducting and participating in depositions and interviews from a remote location, and to a method of providing remote deposition services.

2. Description of the Related Art

Depositions, interviews and conferences are typically conducted by gathering all parties in a room around a table so that each person can see and hear the proceedings and potentially participate in them. In a deposition, the deponent is asked questions orally and provides oral answers to the questions while a court reporter, or official reporter, takes a machine shorthand recording of the questions and answers using a shorthand writing machine, one example of which is a Stenograph® machine. The machine shorthand recording is prepared as a transcript text, is typically provided to the interested parties following the deposition.

In the past, the official reporter has recorded the oral proceedings on a paper tape using a stenograph machine which records in a type of code. The court reporter then prepares the transcript in English from the paper tape of the stenograph machine.

Recently, transcription devices have become available which accept an electronic output from the stenograph machine and convert it to English text in real time, these being known as computer aided transcription (CAT).

SUMMARY OF THE INVENTION

The present invention permits participation in a deposition from a remote location, including live video, two-way audio, real time transcript text and private messaging. Another aspect of the invention is to provide a multi-media transmission of the deposition over the Internet by secure connection, as well as multi-media playback of the deposition at a later date via any computer connected to the Internet. A further aspect of the present invention permits viewing of and participation in a deposition by multiple persons from a plurality of locations without incurring travel expenses and the associated loss of time. A further aspect of the invention is to permit notes and commentary to be made into the multi-media deposition record by the participants as the deposition is ongoing, and the notes viewed at the corresponding part of the deposition during playback.

In particular, the present invention enables lawyers to remotely take or attend depositions as they happen from anywhere to anywhere with a reliable Internet connection. With the present invention, lawyers travel less, save costs, depose better. No special software or equipment is needed. The present invention provides on-line depositions via a web site, enabling attorneys to participate in a deposition from wherever they are, as long as they have access to the Internet. During a deposition, the present invention will simultaneously deliver live video, two-way audio, court reporter running transcript, and private messaging to any desktop or laptop PC.

These features and advantages as well as others are provided in a remote deposition and interview system and method that includes a digital video camera and microphone in the deposition room which are linked to a computer system that is also connected to the court reporter's recording machine. The two-way audio, video and transcript information is packaged and forwarded through a broadband connection over a network, such as the Internet, to remote users who are logged onto the remote monitoring system. The remote user sees the video, hears the audio portion of the deposition or interview and can speak using the two-way function, and views the text of the transcript as prepared by the court reporter.

An additional advantage is provided by a chat capability linking the remote user to the computer in the deposition room. The remote user may communicate to those in the deposition room via the chat window. The remote user and the persons in the deposition room may both mark portions of the transcript, including adding annotations.

To set up and use the present invention, the room where the deposition is to be held is prepared by insuring that network connections are available, addresses of domain name servers are known and that communication ports are available. After the communications are configured, the court reporter or other personnel attending or servicing the deposition sets up a field kit which includes a computer such as a notebook computer or the like, a video camera which may in some instances be incorporated into the computer, and one or more microphones. The computer is connected to receive data from the court reporter's shorthand writing machine and to a broadband connection to the network. Software is initiated on the computer for encoding of the video and audio signals and for accepting the feed from the shorthand writing machine using computer-aided transcription data.

The various components of the remote deposition transmission are sent over the internet connection or other network connection. Processing of the transmission in one embodiment, is handled by separate companies or services, such as using separate dedicated networks, for the two-way audio feed, the audio and visual feed, and the transcript and chat feed. By breaking the transmission out to separate networks, there are bandwidth advantages, resulting in higher quality. However, it is contemplated in the present invention to incorporate all these services under a single provider or company.

A remote user accesses the deposition transmission through access to an Internet World Wide Web site using a computer with an Internet connection and browser software. Preferably, the receiving computer includes sound playing capability including a sound card and speakers, although this is not necessary in every case. The remote user views the video of the deposition which includes both the video and audio component, which is one direction only. Currently, the audio and visual feed is delayed by a six to ten second delay to accommodate for delays in packet switching and transmission over the Internet such as due to encoding processes or transmission issues.

A second component of the remote deposition transmission is a two-way audio component. The audio portions of the deposition are recorded by the microphones in the deposition room and transmitted to the remote user and at the same time the remote user can transmit audio information back into the deposition room. Remote users can talk to each other using the two-way audio. This two-way audio portion is separate from the audio portion associated with the video. The present invention permits switching between the two-way audio component and the audio/visual component of the deposition transmission. The two-way audio is real time, rather than having the 6 to 10 second delay imposed.

Another component of the deposition transmission is the transcript portion. The feed from the court reporter's stenograph machine is fed into the system and is scrolled as text on the displays of the computers in the room for the deposition as well as for the remote users.

An added feature of the invention permits users of the system, both remote and in the deposition room to annotate and highlight portions of the transcript. These highlights and annotations are recorded along with the transcript.

A further component of the deposition transmission is a chat window. This chat window permits the persons in the deposition room to communicate with the remote users via a two-way text communication in a way that does not introduce the participation into the record as recorded by the court reporter. Remote users may chat with each other. Another feature permits users to send files to each through the chat feature.

The present invention also provides a method for making remote deposition services available. The method includes the steps of preparing the deposition room for the deposition by insuring availability of broadband connection and communication port availability. According to the invention, court reporter services and agencies or other legal support persons are trained and provided with field kits for utilization in the depositions. The users of the service are trained and supported. The deposition transmission is processed for audio/visual, two way audio, and text communications through a single in-house service or through out-sourced services. The deposition transmission is made available via a network such as the Internet on a World Wide Web browser through a secure connection.

A further aspect of the present invention is to equip and train court reporters, legal support person, or other service providers in each region of the country to insure country wide availability of the remote deposition service. A further aspect is to provide dedicated broadcast stations so that field kits do not need to be set up each time.

Thus, the present invention provides access to depositions anywhere that an online computer is available such as hotels, homes and offices. Participation in the deposition can include experts, associates or senior partners of the attorney taking the deposition, clients, or other members of the legal team.

A further aspect of the invention is to charge for the remote transmission of the deposition on a time basis with each connection to an individual incurring a further charge.

In a further aspect of the invention, registration scheduling, tracking, billing and transmission of the depositions is conducted through a database running on a server computer, preferably using an Internet access through a World Wide Web browser.

DETAILED DESCRIPTION OF THE PREFERRED EMBODIMENTS

Figure 1:
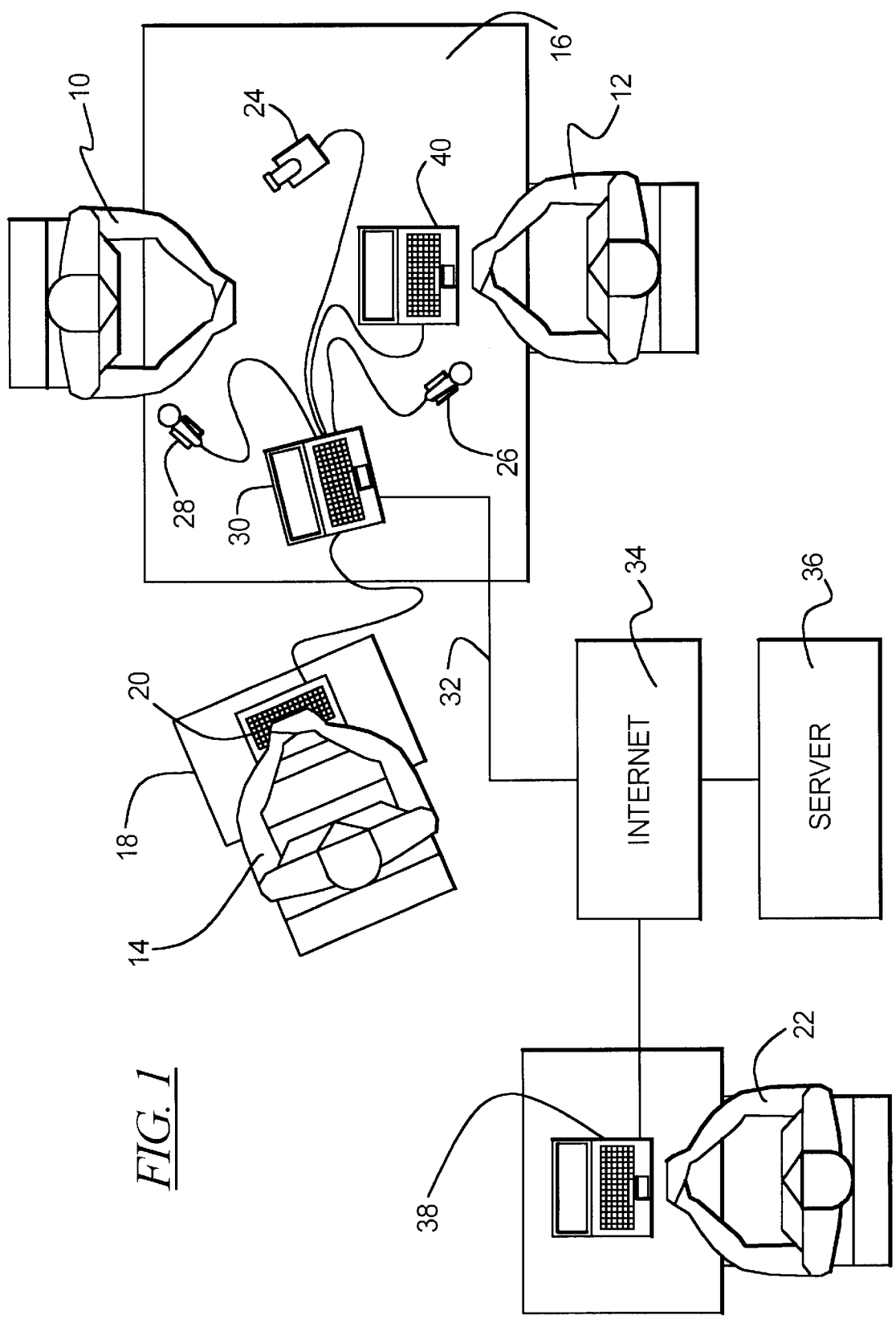
FIG. 1 is a top plan view of a deposition as it is being taken and a remote user accessing the deposition according to the principles of the invention.

Referring first to FIG. 1, a deposition is shown in progress in this top view. The persons participating in the deposition include a deponent 10, who is the person whose deposition is being taken, an attorney or questioner 12 who is taking the deposition, in other words is asking questions of the deponent 10, and an official reporter, or court reporter, 14, who is recording what is being said at the deposition. The deponent 10 and the attorney 12 are seated on opposite sides of a table 16 and the official reporter 14 has a separate stand 18 on which is placed a recording apparatus, or shorthand writing machine, 20. An ordinary deposition is conducted using only the foregoing components. The official reporter 14 prepares a transcript from the machine shorthand of the recording device 20 and provides it at least to the attorney 12 some time after the deposition.

The illustrated deposition is being conducted, however, according to the principles of the present invention so that a remote user 22 can participate. A video camera 24 is provided directed to record the deponent 10, and microphones 26 and 28 are positioned to record the spoken words of the attorney 12 and the deponent 10. A single microphone such as an omnidirectional microphone may be used instead of two microphones. The video camera 24 and microphones 26 and 28 are connected to a first computer 30, also termed an encoder computer. The first computer 30 is also connected to the shorthand writing machine 20 of the official reporter 14. A broad band connection 32 is provided from the first computer 30 to a network, such as the Internet 34. Also connected to the Internet 34 is a server 36 for storing and processing the data.

The remote user 22 has a remote computer 38 that is connected to the Internet 34 and by which the remote user 22 can view and hear the deposition, and may also participate in it. As an option, a second computer 40 may be provided at the deposition. The second computer 40, termed an attorney view computer, is provided in this situation for the attorney or questioner 12 and is connected to the first computer 30. The official reporter may have a computer as well, which is connected between the shorthand writing machine and the encoder computer. The official reporter's computer is preferably running software to convert the shorthand writing machine output to a standard format, such as CaseView.

In operation, the attorney 12 asks a question of the deponent 10 and the question is recorded by the official reporter 14 onto the shorthand writing machine 20. The audible speech of the attorney 12 is also picked up by the microphone 26 that is directed toward the attorney 12. The first computer 30 prepares the signal from the microphone 26 for transmission over the network connection 32 such as by packet transmission and sends it over the Internet to the server 36. The first computer 30 also receives the electronic output of the shorthand writing machine 20 and converts it into a transcript text and sends that transcript data over the network connection 32 to the server 36. The server 36 presents the transcript data and audio data via the Internet 34 to the remote computer 38 so that the question may be heard by the remote user 22 and the text of the transcript is also seen by the remote user 22. The remote computer 38 has sound playing capabilities to play the audio signals, such as by built in speaker or by external speakers.

The deponent 10 answers the question, which is picked up by the microphone 28 and forwarded to the server 36 by the first computer 30 over the network connection 32 and the Internet 34. The image of the deponent 10 answering the question is picked up by the video camera 24 and sent to the first computer 30, where it is processed and forwarded over the network connection 32 to the server 36 over the Internet 34. The remote user 22 can hear the answer and also see the deponent 10 as the deponent answers. Of course, the video image of the deponent 10 was also transmitted to the remote user 22 as the question was asked so that the remote user 22 can see the physical reaction of the deponent 10 to the question.

The remote user 22 also receives the transcript text of the answer from the shorthand writing machine 20 via the first computer 30. In this way, the remote user 22 sees and hears the deposition in progress while viewing the text of the transcript.

The second computer 40 at the deposition location permits the attorney or questioner 12 to also view the transcript text and the video signal. Viewing the transcript text as the deposition is ongoing may permit the attorney 12 make a better record of the proceedings, as subtleties of the question or answer may not come through on the written record and can be clarified during the deposition. The attorney 12 can ensure that the video signal is showing the deponent 10 to the remote user 22 and that the remote user has not moved out of view, either totally or in part.

A further advantage of the second computer 40 is that a chat connection may be made between the second computer 40 and the remote computer 38. This chat connection enables the remote user 22 and the attorney 12 to communicate with one another in writing as the deposition is ongoing. The remote user 22 may call the attorney's attention to some aspect of an answer or question so that further questioning can be conducted on that issue.

The remote computer 38 may be equipped with a microphone or an external microphone may be provided so that the remote user 22 may speak and the audio signal of the remote user's voice is heard in the deposition location, such as through speakers in either the first or second computers 30 and 40. The remote user 22 thereby participates in the deposition from the remote location.

As will be discussed later, the remote user's computer 38 has controls for initiating an objection to some question or answer or may include some set of responses or actions that can be triggered by the remote user 22, which trigger an audible signal at the deposition location.

Figure 2:
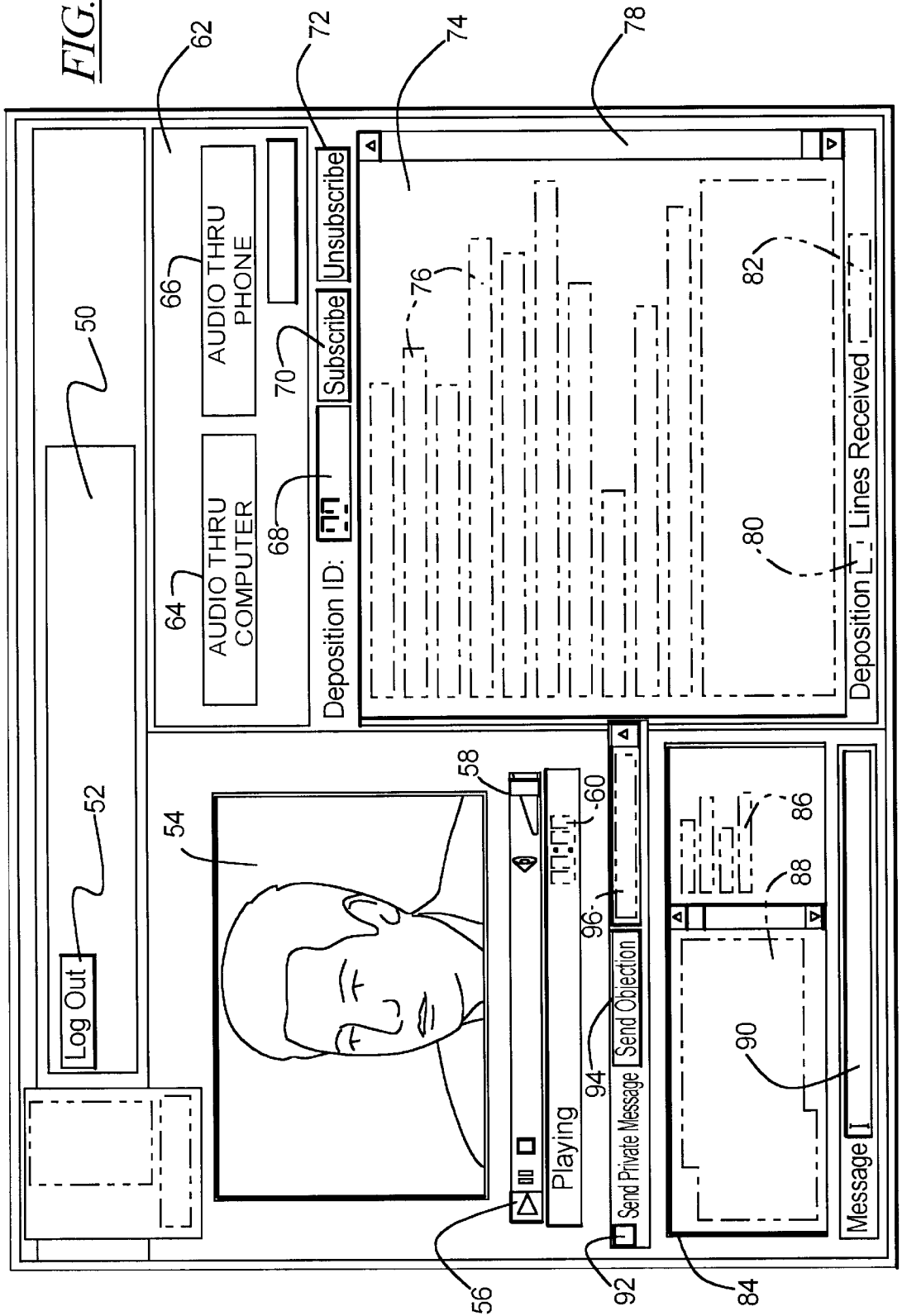
FIG. 2 is a screen view of a computer of the remote user while accessing the deposition using the present invention.

A sample view screen of the remote computer 38 or of the attorney view computer 40 is shown in FIG. 2. Specifically, a heading box 50 is provided with information to identify the deposition, such as the deponent's name and the case name. A log out button 52 is provided for the remote user to log off the deposition. In a media player window 54 is a video image of the deponent 10. The media player window has controls 56 for play, pause and stop as well as for volume control 58. A time indicator 60 is also shown. Audio buttons are provided in a separate window 62, including a two-way audio through the computer button 64 and a two-way audio through the telephone button 66. Activation of the two-way audio button 64 brings up the two-way audio control center which permits multi-directional conversation. Activation of the telephone button 66 provides telephone access for dialing in to the deposition. This is accomplished through a conferencing feature enabling all participants to speak over their telephones via the Internet connection.

Below the audio controls is a window 68 to identify the deposition by number, as assigned in the database on the server 36.

Below the window 68 is a window 74 in which is shown the scrolling text of the transcript as taken from the shorthand writing machine 20. Lines of text 76 show the spoken transaction of the deposition, which scroll by the viewer. The text may be moved on the screen to access an earlier statement using the slide control 78. The users may activate lines of text 76 by a cursor, such as a mouse, and either highlight the text for later review or activate a note capability by which a text note may be associated with the selected text.

A deposition sequence number for the case is shown at 80 and an indicator 82 shows the number of lines of text received.

A chat window 84 is located below the video image 54 and includes a list 86 of participants that are color coded, and the scrolling text of the chat 88 having corresponding color coding so show the submitter of the statement. Messages are submitted by typing in a message window 90 and pressing "enter" on the computer, whereafter the message is transmitted to all participants and displayed in the chat window 88.

Private messages are possible by a command 92. Objections may be made by pressing an objection button 94 and selecting the grounds of the objection from a pull down list 96.

The data for the present invention is linked together to assure that the video, audio, and transcript text data are kept together. This is true for the data as it is transmitted for the original deposition, as well as for the data as it is re-transmitted for later viewing. The chat data is not saved, although it can be.

Under current procedures for the combined audio and video data transmission over the Internet, a brief delay is provided to permit delayed packets to catch up. This causes a brief delay in the voice and video communications to the remote user. Such delays can be eliminated using real time two way voice communications. When two-way voice communications are desired, a real time two-way audio over the Internet is activated, or a telephone line connection may be set up by dialing in and setting up a telephone conference call. This may be required for users who's computers do not have sound playing capabilities.

Figure 3:
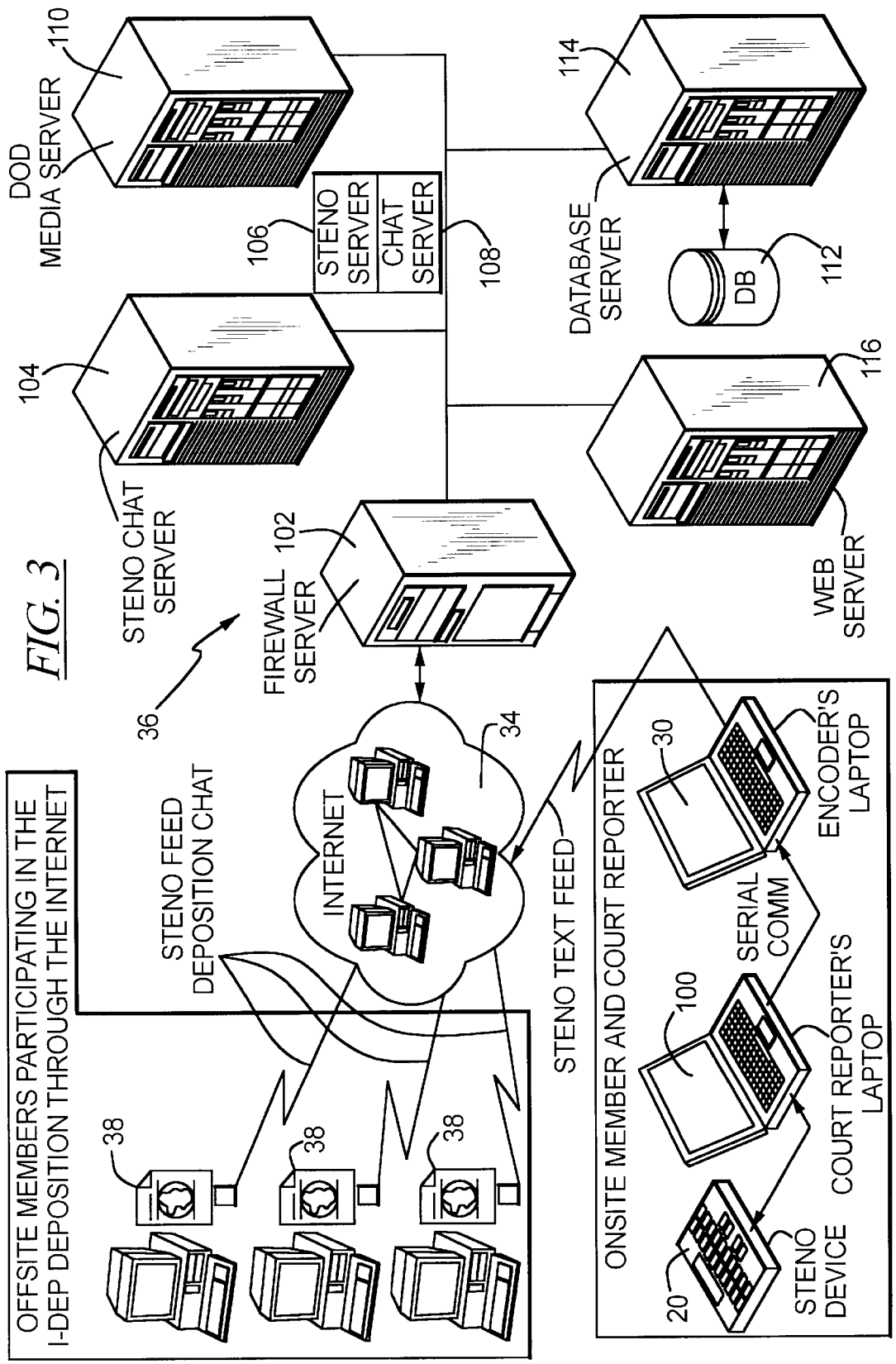
FIG. 3 is a network diagram of the server configuration by the provider of the remote deposition services.

The server configuration for the service provider is shown in FIG. 3. The deposition site includes the shorthand writing machine 20 connected through an official reporter's computer 100 to the encoder computer 30. The Internet 34 transmits the data to the server 36, which in more detail includes a firewall server 102. Behind the firewall 102 is found a transcript text and chat server computer 104 which has separate server software running for transcript text 106 and chat 108. A server computer 110 is provided for the replay of the deposition at a later time. The database 112 through which scheduling is performed is run on a database server computer 114. The web page by which the remote computers and the attorney view computer access the deposition is provided on a web server computer 116. In the illustration, a plurality of remote users are shown accessing the deposition data.

Figure 6:
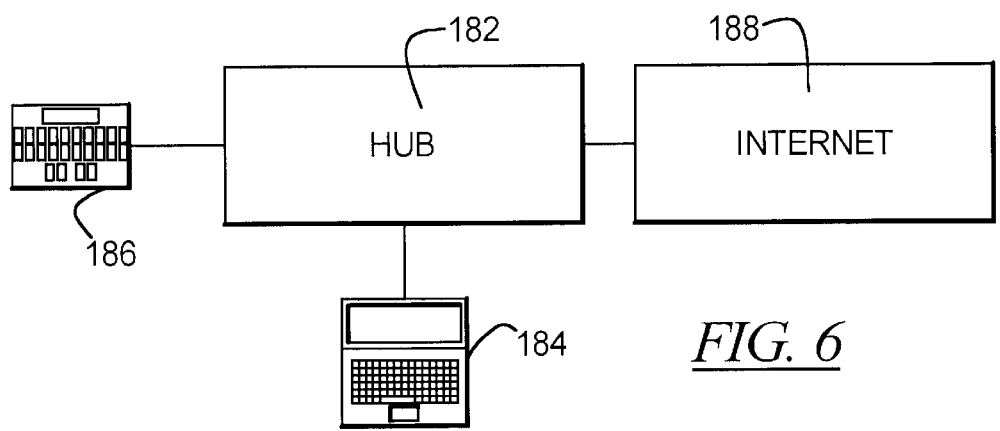
FIG. 6 is a functional block diagram of a single encoder computer and hub configuration for the deposition.

A further embodiment is shown in FIG. 6, wherein a hub 182 is provided to which a single computer 184 is connected. The computer functions as an encoder and attorney view computer. The official reporter's shorthand writing machine 186 is connected to the hub 182, and a connection is provided to the Internet 188 through the hub 182.

Field Kit

Figure 7:
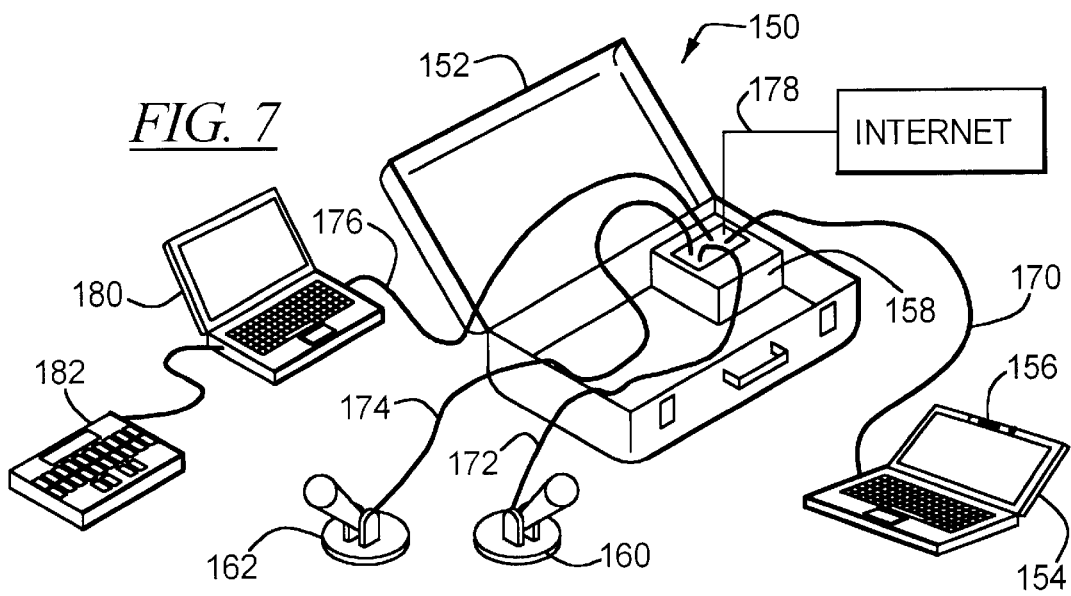
FIG. 7 is a perspective view of a field kit set up for a deposition as a further embodiment of the invention.

As shown in FIG. 7, the equipment required at the deposition site is included in a field kit 150, which is a portable encoding system that is used to record and store full video, two way audio, real time transcript and used to participate in private messaging of the deposition as it takes place. The kit contains one or two small laptop computers with attached cables and accessories that are designed for quick set-up. The entire field kit fits into a case 152 smaller than the size of a standard carry on luggage case.

The field kit components of a one embodiment include: two laptop computers with two AC power adapters, two PC Card (PCMCIA card) network connector cables, four network patch cables, one 4-Port ethernet hub and AC power adapter, one USB serial port cable, one outlet/power surge protector, two external microphones, one standard serial cable female/female connector type.

In a preferred embodiment, only a single laptop computer 154 is provided and both the encoder functions and attorney view functions are performed by this one computer. A laptop computer being used in an embodiment of the present invention is the Sony Picturebook computer, which incorporates a video camera 156 into the computer, so that a separate video camera is no longer required.

The field kit is provided in the carrying case 152 and, in a preferred embodiment, the case has the hub 158 built in to it and the laptop computers are wired to the hub connections in the case 152. This eliminates one of the parts and simplifies set up.

The illustrated field kit of FIG. 7 also has two microphones 160 and 162 as well as cables 170, 172, 174, 176 and an internet connection cable 178. The cable 176 connects the laptop computer 180 of the official reporter to the hub 158. The official reporter has brought in to the deposition his or her own computer 180 that is connected to the shorthand writing machine 182. The computer 180 generally is used for the transcript conversion from machine shorthand.

Of course, other embodiments of the field kit are possible, including having two or more computers, more or fewer microphones, and additional video cameras.

Connection Set Up

Prior to taking a deposition for remote access according to the present invention, the location must be readied and the services scheduled. For the location, the physical requirements are enough tabletop space for the laptop computers, an extension cord that reaches the center of the table, that facilitates three electrical outlet plugs, and a network cable that reaches the center of the table. For the network connection, the site is readied by enabling use of a public IP address that is known to the remote deposition company, a private IP address for the viewing laptop, as well as opening up ports in the firewall. The public IP address enables the encoding laptop computer to be reachable by servers on the Internet. The private IP address enables the viewing laptop to browse the web and attend the scheduled deposition. The TCP ports enable live video and audio streaming during the actual deposition, permit the text feed to reach the distribution server, and enables chat functionality to occur. The open ports specifically provide the HTTP TCP port, a transcript text TCP port, a chat TCP port, and a MS Windows media encoder port.

Security is provided by requiring each user to enter a user identification and password. Each deposition also has its own password and unique identification number. If more than one party is attending the deposition using the present system, then each party also has their own password. The data transmission is by secure connection and the servers are all behind a firewall. The secure connection is provided by secure socket layer (SSL) technology to ensure that all communications are encrypted.

Back End Database

The present invention provides an Internet site for registration, tracking, scheduling, and billing the depositions. Remote depositions can be scheduled through the scheduling database, using the web page at the Internet site or through a customer service representative who updates the database. All activities can be tacked through the back end database including official reporter participation. Scheduling includes providing information such as user identification and password, case number and forum state. Information is then provided on the parties to the case, the time and date of the deposition and the name of the deponent. The site of the deposition is then identified. A confirmation of the scheduled deposition is sent, such as by e-mail. The scheduled deposition is in the database 112 on the server computer 114 by the scheduling process.

Once the organization and user has been registered and the deposition has been scheduled, the workflow process begins; including: following needs to be completed:

Contact the deposition site to make sure they have the proper Internet connection to broadcast the deposition. Client network should have a minimum Internet access speed of a DSL 144 kbps connection or higher for a video connection. The present invention in one embodiment utilizes about 70 kbps for the data stream. The recommendation of 144 kbps is so that the deposition data stream does not choke off the bandwidth of the company or facility hosting the deposition. An ideal network connection provides 256 kbps. If a deposition without video is acceptable, a significantly lower transmission capability is possible. If it is the first time broadcasting from the site, a standard stream test must be performed at the deposition site prior to the scheduled deposition using the field kit or port checker software. A customer service representative will e-mail to the scheduler of the deposition, the Internet settings that will be needed for the broadcast. The scheduler of the deposition is responsible for contacting participants and disseminating the deposition case number and password. All users that will be attending the deposition must complete the following:

Register as an organization and a user through the web site or by calling in;

Complete a "Test Your Computer" process;

Schedule the deposition; and

Obtain the deposition case number and password.

The following are the guidelines for configuring both of the Field kit laptop computers used at the deposition site. The following steps must be performed on both of the laptop computers, where two computers are to be used, or on the single computer where a single computer is used to complete the networking configuration. All of the necessary networking information to be used for the deposition will be e-mailed by an customer service representative prior to the scheduled deposition. Each laptop will have its own unique networking information. In most cases, the networking settings from the previous deposition will need to be removed before applying the new settings. The official reporter or the technician is responsible for changing the settings prior to going to the deposition site.

The network settings for the computers at the deposition site including configuring the TCP/IP for ethernet PC card component by specifying an IP address and a subnet mask. New default gateways are added and primary and secondary DNS (domain name server) IP address settings are set up. This is preferably done before arriving at the deposition site.

Upon arriving at the deposition site, the two computers, or single computer, are connected to the hub if not already connected and the hub is connected to the network connection for the deposition site. The official reporter's computer is connected to the encoding laptop and the software is set to enable time stamped transcript output. For example, on the official reporter's computer in the deposition room a transedit command is opened, Stentura is selected, and CaseView is set as the output, with a clock time option selected. The laptop computer(s) for the deposition site is/are turned on and the Windows media encoder selected. Settings to archive the deposition are set, the name and number of the deposition are entered and automatic indexing is set. A stenoencoder program is set in a JAVA environment and the start deposition command is selected. The feed from the official reporter's shorthand writing machine is connected to a serial port of the encoder computer.

Where two computers are used, one is the encoder computer and the second is the attorney view computer. The attorney's computer in the deposition room is set up by being turned on, opening the Internet browser software, such as Microsoft Internet Explorer, and accessing the web page of the deposition provider company. The particular deposition number and user identification is entered to log into the deposition.

The deposition is now ready to begin. At the end of the deposition, the programs are exited and the computers turned off and placed back into the field kit case.

The deposition data may be recorded (captured) at the remote deposition service provider's servers, or by capturing it on site such as on the field kit computers and sending back the field kit for transfer of the data, or on high capacity media, or by upload. For example, the official reporter transmits the transcript text and the archived video data to the servers of the provider company as soon after the deposition as possible, and preferably from the deposition site using ftp (file transfer protocol). The data is uploaded to a directory of the server computer using the known ftp procedures. The video transfer time depends on the connection speed, and the broadband connection at the deposition site may still be available to the official reporter at the end of the deposition. If not, it is possible for the transcript text (a smaller file) to be uploaded immediately, and the video portion uploaded later when a high speed connection is available. So even if the Internet connection goes down, the data is captured.

Remote Access

The remote access to the deposition is provided through any computer connected to the Internet and having a World Wide Web browser program. The computer should have a fast enough processor to provide smooth video, such as a Pentium® processor or equivalent running at 166 MHz, or faster. The Internet connection should be capable of 56 kbps connection speed, although the present invention operates with a 48 Kbps connection, yet a full video deposition is possible at this speed. The computer requires a sound card or circuit and speakers and a media player that will play streaming video, such as Windows Media Player version 6.4. If no sound card is present, the telephone dial in function is used to provide the audio portion of the deposition. The browser program, such as Microsoft Internet Explorer version 4.72, may have a chat capability, but if not a separate program may be required, such as MS Virtual Machine.

To attend the deposition remotely, the user logs into an Internet web site, provides the case number organization number, user name and password and an identification of the deposition. The depositions for a given case are illustrated by hyperlinks and are easily accessed by activating the corresponding link. The status of each deposition in the case is displayed, including information on the reasons for changes in status!

Remote users may make objections by an objection command that is provided on their computer screen. A specific objection such as foundation, asked and answered, etc., may be made by selecting from a drop down menu on the user's screen. Once made, the objection is audibly announced in the deposition room and the objection maker may watch the objection appear in the chat room and in the scrolling text of the transcript.

Both the remote user and the attorney at the deposition may make notes in the transcript as the deposition is ongoing. This can be by adding text notes, which are saved at the location made and become part of the individuals copy of the transcript record. The users may also highlight portions of the text, such as by using a highlighter tool in the interface program. Significant portions of the text may thus be found easily upon subsequent review.

Each remote access to the deposition incurs a time charge, so that persons needing to remotely attend only a portion of the deposition are only charged to that portion that they attend. This is in addition to a set up charge.

Where both parties to the case request access to the remote deposition data, separate chat rooms may be provided for each. These would be blocked from one another, but may include a common area for comments on objections, etc., and to verify that only proper parties are in attendance.

Deposition Viewable Later

Figure 4:
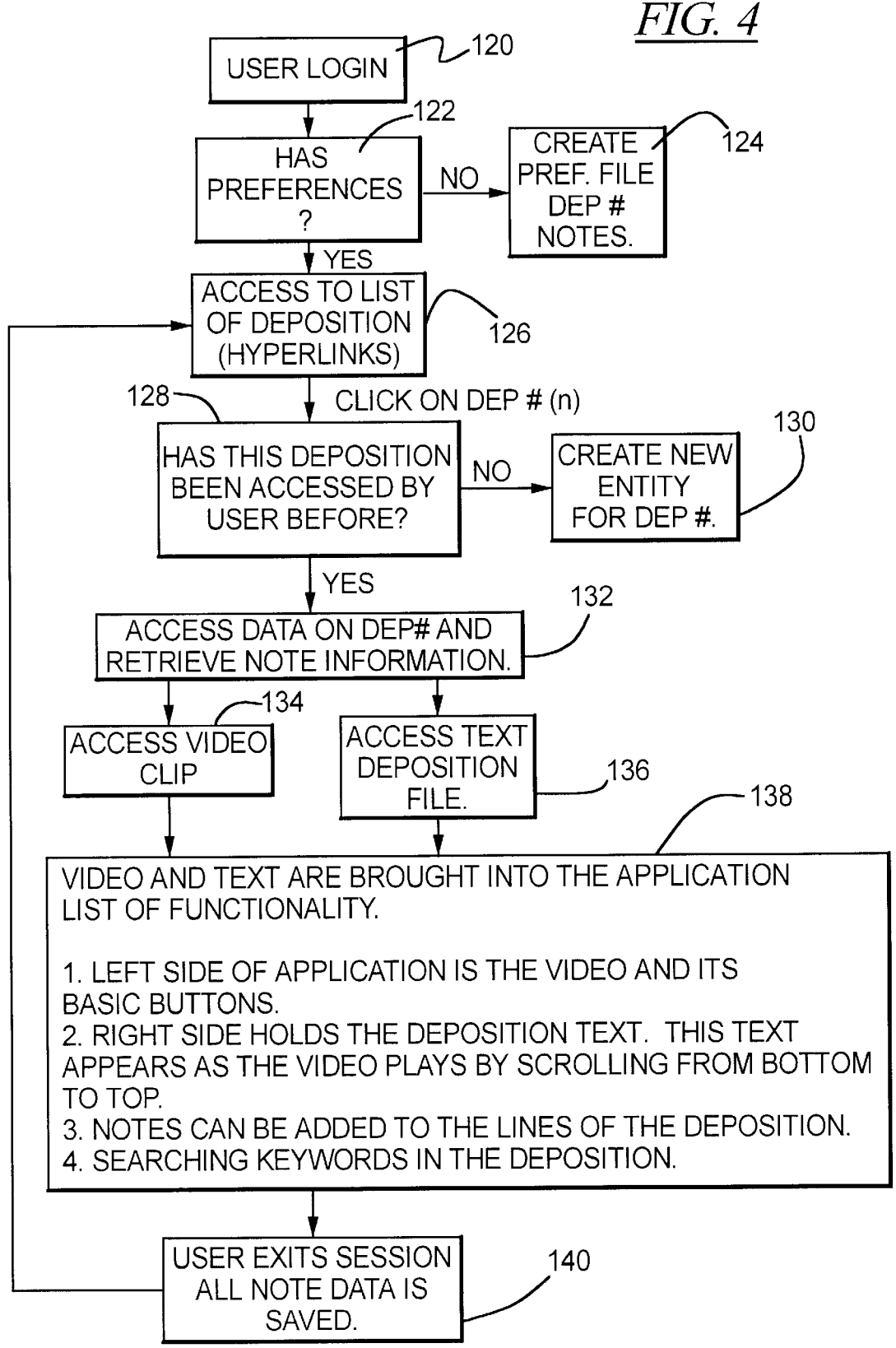
FIG. 4 is a process flow chart for accessing the deposition data after the deposition is over.

As shown in FIG. 4, the deposition may be viewed later.

To view a deposition later, the user logs into the provider's entrance page at 120, such as by entering the organization number, user number, case number, deposition number and user password. The preferences of the user are checked at 122 and new preferences are created if needed, at 124.

Each user has depositions, notes and line numbers assigned to them, which is checked at 126. Once a deposition is selected, the process determines if the user has accessed that deposition before, at 128, and if not creates a new entry, at 130. Note information for the user is accessed, at 132. The user may view the deposition video using play, stop, fast forward and rewind commands, as is known, at 134, or may access the text of the transcript, at 136. Each line of text in the transcript is provided with a time stamp number that corresponds to a frame location of the video. As the video frame appears, the corresponding text is displayed. In addition, each line of text is hyperlinked so that activating the hyperlink takes the user to the corresponding video frame. A note capability is provided wherein activating the note, such as by a double click permits the user to enter text that will be linked to that portion of the transcript. Once a note is made in the transcript, an icon appears in the transcript text to indicate the presence of the note. The user may also perform searches for text strings in the deposition transcript or even in the notes. These functions as shown at 138. At the end of the session, the user exits and any notes the user has made is saved, at 140.

Access to the previously recorded deposition on-line may be charged on a time charge, so that the user pays for only what is used.

In addition to being able to recall the deposition data on-line, the present invention also provides that the data for the deposition may be recorded, such as on a magnetic tape, is CD or DVD, and played back, stored and used in trial at will by the user.

In a further aspect of the invention, the data stream of the deposition may be exported into litigation management software, such as Summation, Case Central, or Live Note.

Outsourced Data Processing

The entire data stream for the deposition may be processed by a single provider, however, various specialty services exist for processing streaming data of various types. In an embodiment of the present invention, the two way audio streaming data from the deposition is processed by an outside provider, such as HearMe. The HearMe service is set up to as if a conference is being set up, by creating rooms, joining rooms and specifying a moderator and participants. The two way audio utilizes a Perl Script and voice applet on the local computer, and is connected to a talk server of the service provider.

The video streaming data is also processed by an outsourced service, such as by Activate video streaming and one way audio, in one embodiment.

The transcript text and the chat functions run through the servers of the present remote deposition service provider. Thus, the outsourced operation creates three separate dedicated networks to provide the remote deposition data.

Registration

Users seeking to use the present invention need to register beforehand. Organizations, such as law firms, may register or individuals may register by themselves. This can be done through an Internet web site. Registered organizations and individuals are provided with an account number and password, such as by e-mail. Registration causes the information of the registered organization and individual to be entered into the database on the provider server computer. Once the organization is registered, individuals within the organization may register as users.

The registration process may, in a preferred embodiment, conclude with a test the user's computer process to ensure that the user's computer is capable of handling the remote deposition data stream. For example, the process may test the operating system, processor, internet connection, audio, browser program, media player, and chat program.

Marketing

Figure 5:
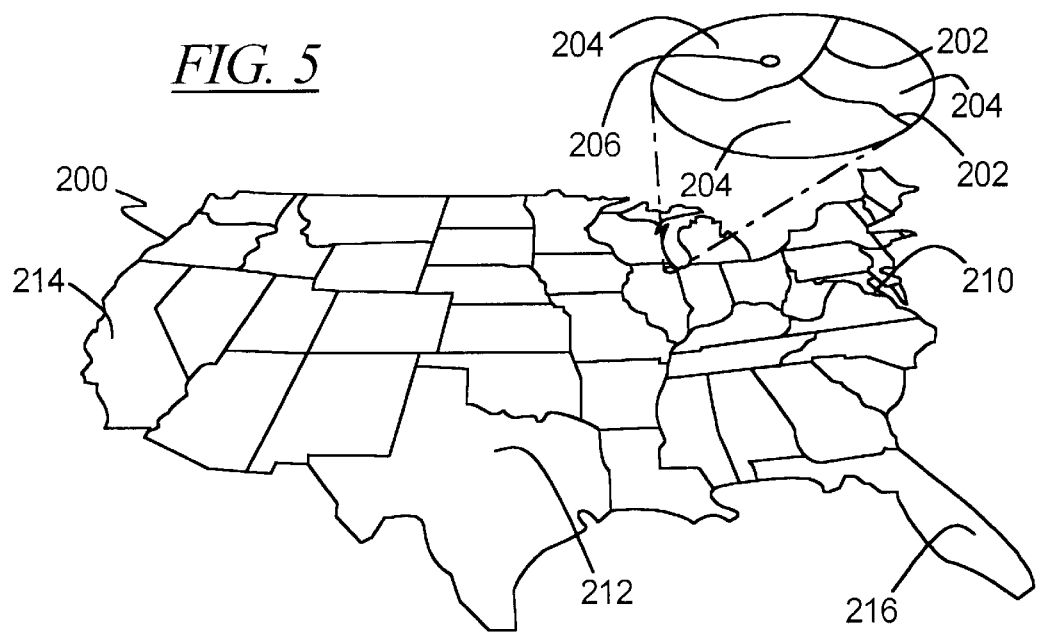
FIG. 5 is map of the continental United States indicating market regions for providing remote deposition services.

For the remote deposition service to be useful in a case, it should be available wherever a deposition is needed. The equipping and training of the personnel to set up the field kit, however, provides some limitation to widespread distribution of the service, at least initially. Thus, an aspect of the present invention is to make the service available wherever needed, by the steps of identifying major market areas for deposition services, identifying official reporter services within each market area, establishing a relationship with at least one of the official reporter services for each market area to provide remote depositions, and training and equipping at least one official reporter at each of the remote deposition providers. For example, FIG. 5 shows the continental United States 200 and the remote deposition may be scheduled anywhere in the country. One area is enlarged to show market area boundaries 202 which divide the region into market areas 204. A deposition may be scheduled at a location 206 within one such market area 204 and the provider of the remote deposition equipment needs only to travel within that market area 204. Reduced travel to provide the equipment is accomplished.

The country 200 is divided into many such market areas so that a user of the present service is thereby able to arrange depositions at locations throughout the country and have remote deposition capability at each deposition. As an illustration of the capability of the present invention, the deposition may be taken at 206, while a supervising attorney may be participating in the deposition from a hotel room in another city, at 210, and an expert in the relevant field may be at home in yet another city in another area of the country, at 212. A principle of the client may check in on the progress of the deposition from his office, at 214. All of this occurs without travel expenses or related loss of time, and without special equipment on the part of the remote users. At the conclusion of the deposition at 206, the supervising attorney may immediately switch over to another deposition that is on going or just starting in a further city, at 216, all without leaving the hotel room at 210.

In establishing the relationship with the official reporters, the official reporters may act as representatives of the service, be involved as revenue sharing partners, or participate in co-branding relationships and/or co-marketing of the remote deposition service.

Other Uses

The present invention can be used for court room hearings where one or more of the participants cannot physically attend. It is possible that the official reporter, who here is referred to as a court reporter, may be in a location remote from the hearing and may prepare the transcript from the video and audio feed. The present invention can be also used for interviews, such as witness interviews and or job interviews. Another possible use is for close captioning for the deaf. It is also foreseen to utilize the present invention for conferences and open forums, or any instance where remote communications can be used. Some examples include: training for depositions and beyond; witness evaluations; employee evaluations; presentation and interviews within courts, prisons and government; real estate closings; trial presentation of I-DEP depositions; jury focus groups; medical evaluations; online education; and investigations.

Although other modifications and changes may be suggested by those skilled in the art, it is the intention of the inventors to embody within the patent warranted hereon all changes and modifications as reasonably and properly come within the scope of their contribution to the art.

We claim:

1. A remote communication system, comprising:
a digital video camera at a first location;
a microphone at the first location;
a local computer apparatus at the first location connected so said video camera and said microphone;
a high bandwidth connection from said computer apparatus to a network to transmit video and audio signals from the first location to said network;
at least one server connected to said network to receive said video and audio signals for retransmission;
a remote computer apparatus at a location remote from the first location and connected to said network to receive said video and audio signals from the first location;
a transcription apparatus at the first location;
a connection from said transcription apparatus to said local computer to communication transcription data from said transcription apparatus to said local computer, said local computer transmitting said transcription data over said network to said remote computer apparatus;

a microphone at said remote location connected to said remote computer apparatus to transmit audio signals of said microphone from said remote location so said first location so as to provide two way audio communication between said first location and said remote location simultaneously with said transmission of said transcription data and said audio and video data.

2. A remote communication system as claimed in claim 1, wherein said system is used in a deposition and said first location is a deposition location.

3. A remote communication system as claimed in claim 1, further comprising:
a chat connection between said local computer apparatus and said remote computer apparatus over said network for text communication between said local computer apparatus and said remote computer apparatus to provide text communications between said first location and said remote location simultaneously with transmission of said transcription data and said audio and video data.

4. A remote communication system as claimed in claim 1, further comprising:
software running on said local computer apparatus and said remote computer apparatus for displaying video data at a first portion of a display of the respective computer apparatus and displaying transcript data at a second portion of the display and displaying chat at a third portion of the display.

5. A remote communication system as claimed in claim 1, wherein said network is the Internet.

6. A remote communication system as claimed in claim 1, further comprising:
an objection command selectively operable by a user of said remote computer apparatus, operation of said objection command alerting users at the first location of activation of said objection command during transmission of said transcription data and said audio and video data.

7. A remote communication system as claimed in claim 1, further comprising:
an annotation function selectively operable by a user at at least one of said local computer apparatus and said remote computer apparatus for annotating at least a transcript data.

8. A remote communication system as claimed in claim 1, further comprising:
a highlighting function selectively operable by at least one of a user at said local computer apparatus and said remote computer apparatus for annotating at least a transcript data.

9. A remote communication system as claimed in claim 1, further comprising:
further remote computer apparatus connected to said network for receiving transmissions from the first location; said further remote computer apparatus being located in a location remote from said first location and remote from said remote location, said further remote apparatus receiving said two way audio data and said video data and said transcription data from said first location and receiving said two way audio data from said remote location.

10. A remote communication system as claimed in claim 1, wherein said video camera is integrated into said computer apparatus.

11. A remote communication system as claimed in claim 1, wherein said high bandwidth connection is a broadband connection.

12. A method for providing deposition services, comprising the steps of:
distributing field kits to official reporters, said field kits including video and audio recording apparatus and computer apparatus;
training the official reporters to set up and connect said video and audio recording apparatus and computer apparatus for network transmission of video and audio data from a first location;
receiving the video and audio data and transcript data of a deposition from a first location via a network;
providing the video and audio data and transcript data via the network for viewing at a location remote from the first location;
providing communications via said network from said remote location to said first location during a deposition simultaneously with transmission of said video and audio data and said transcript data.

13. A method as claimed in claim 12, wherein said step of providing communications from said remote location to said first location includes:
providing chat communication between the first location and the remote location; and further comprising the step of:
recording said audio and video data and said transcript data for later retrieval but not recording said chat communication.

14. A method as claimed in claim 12, wherein said distributing step includes the substeps of:
identifying market regions;
targeting at least one court reporter entity in each of said market regions for receiving said field kits;
providing each of said market regions as potential first locations; and
providing remote access to said audio data and video data and transcript data without regard to said market regions.

15. A method as claimed in claim 12, further comprising the step of:
training and supporting users of the deposition services.

16. A method as claimed in claim 12, wherein said step of providing communications from said remote location to said first location includes:
providing two way audio communication between the first location and the remote location; and further comprising the step of:
recording said audio and video data and said transcript data for later retrieval and also recording said two way audio communication.

17. A method of conducting depositions, comprising the steps of:
establishing broadband network access to a first location;
providing video and audio recording equipment and high speed network communications equipment at said first location;
providing computer equipment at said first location connected to said broadband network, said computer equipment including text chat software;
transmitting audio and video signals of a deposition over the network by said high speed network communications equipment as the deposition is conducted;
providing remote access for a remote user to said audio and video signals of the deposition via the network;

providing two way audio equipment at said remote access for the remote user to communicate via two way audio communications to the first location simultaneously with said transmitting of said audio and video signals of the deposition; and providing two way text chat at said remote access for the remote user to communicate via two way text chat communications to the first location simultaneously with said transmitting of said audio and video signals of the deposition.

18. A method as claimed in claim 17, wherein said step of providing the remote access includes providing remote access after said deposition has ended.

19. A method as claimed in claim 17, further comprising the steps of:

providing transcription data of said deposition to said remote access over said network simultaneously with transmission of said audio and video.

\* \* \* \* \*